US009518689B2

(12) United States Patent
O'Connor

(10) Patent No.: US 9,518,689 B2
(45) Date of Patent: Dec. 13, 2016

(54) TWO PIECE MALE HOSE COUPLER AND METHOD FOR SECURING A GARDEN HOSE TO A COUPLER

(71) Applicant: Swan Products, LLC, Totowa, NJ (US)

(72) Inventor: Timothy O'Connor, Eden, NY (US)

(73) Assignee: Swan Products, LLC, Totowa, NJ (US)

( * ) Notice: Subject to any disclaimer, the term of this patent is extended or adjusted under 35 U.S.C. 154(b) by 65 days.

(21) Appl. No.: 14/512,147

(22) Filed: Oct. 10, 2014

(65) Prior Publication Data
US 2016/0102795 A1     Apr. 14, 2016

(51) Int. Cl.
*F16L 33/213*     (2006.01)
*F16L 33/22*      (2006.01)

(52) U.S. Cl.
CPC ............ *F16L 33/223* (2013.01); *F16L 33/227* (2013.01)

(58) Field of Classification Search
CPC ...... F16L 33/213; F16L 33/225; F16L 33/207; F16L 33/2076; Y10T 29/49911; Y10T 29/4994
See application file for complete search history.

(56) References Cited

U.S. PATENT DOCUMENTS

| 1,928,836 | A | * | 10/1933 | Malcolm | B25B 27/10 137/408 |
| 2,795,041 | A | * | 6/1957 | Klinksiek | F16L 33/207 285/256 |
| 2,924,009 | A | * | 2/1960 | Mazeika | F16L 33/213 285/258 |
| 3,345,090 | A | * | 10/1967 | Weatherhead, Jr. | F16L 33/207 285/256 |
| 5,370,425 | A | * | 12/1994 | Dougherty | F16L 33/207 228/113 |
| 8,096,588 | B2 | * | 1/2012 | Winzeler | F16L 33/213 285/242 |

* cited by examiner

*Primary Examiner* — Rodney Mintz
*Assistant Examiner* — Daniel Kenny
(74) *Attorney, Agent, or Firm* — Polsinelli PC

(57) ABSTRACT

Two piece male hose coupler assembly includes a nut and a separate expandable tube. The nut has a first end portion with male threads on the exterior surface, and a second end portion having a gripping collar on the exterior surface. The nut has an open through bore defining an interior surface. An expandable tube is positionable within the bore of the nut, wherein the tube is expanded outwardly to pinch one end of a hose between an exterior surface of the tube and the bore of the nut so that the hose is sealed between the tube and the nut. Further, the tube has a radial flange at one end that seats against a radial mating surface at or adjacent the first end of the nut. The assembly thus provides a relatively leak proof connection including sealing surfaces between the mating radial flanges, and also along the mating longitudinal surfaces of the nut and hose extending along the longitudinal axis of the hose. A method is provided for assembling the nut and tube at one end of the hose.

8 Claims, 4 Drawing Sheets

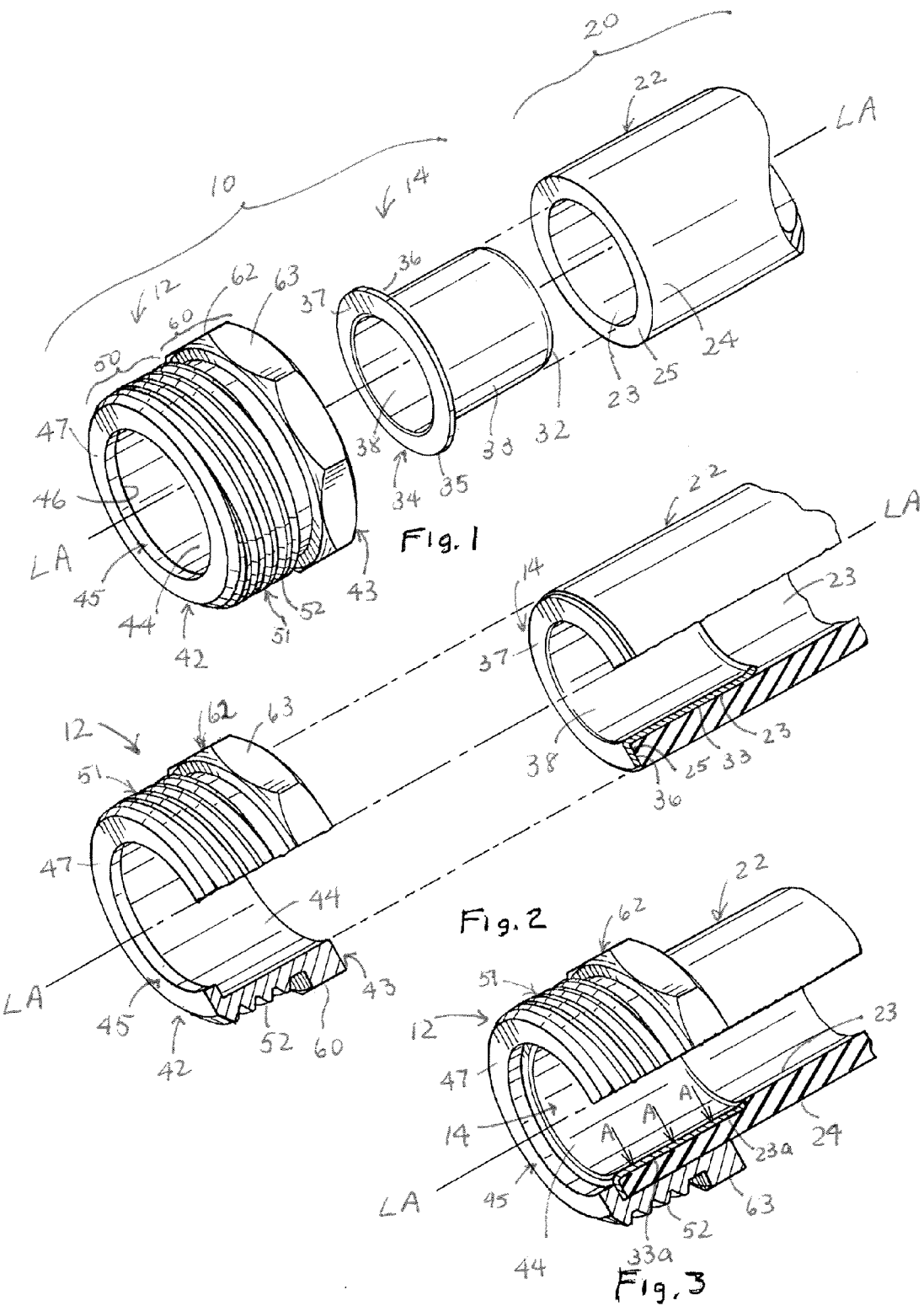

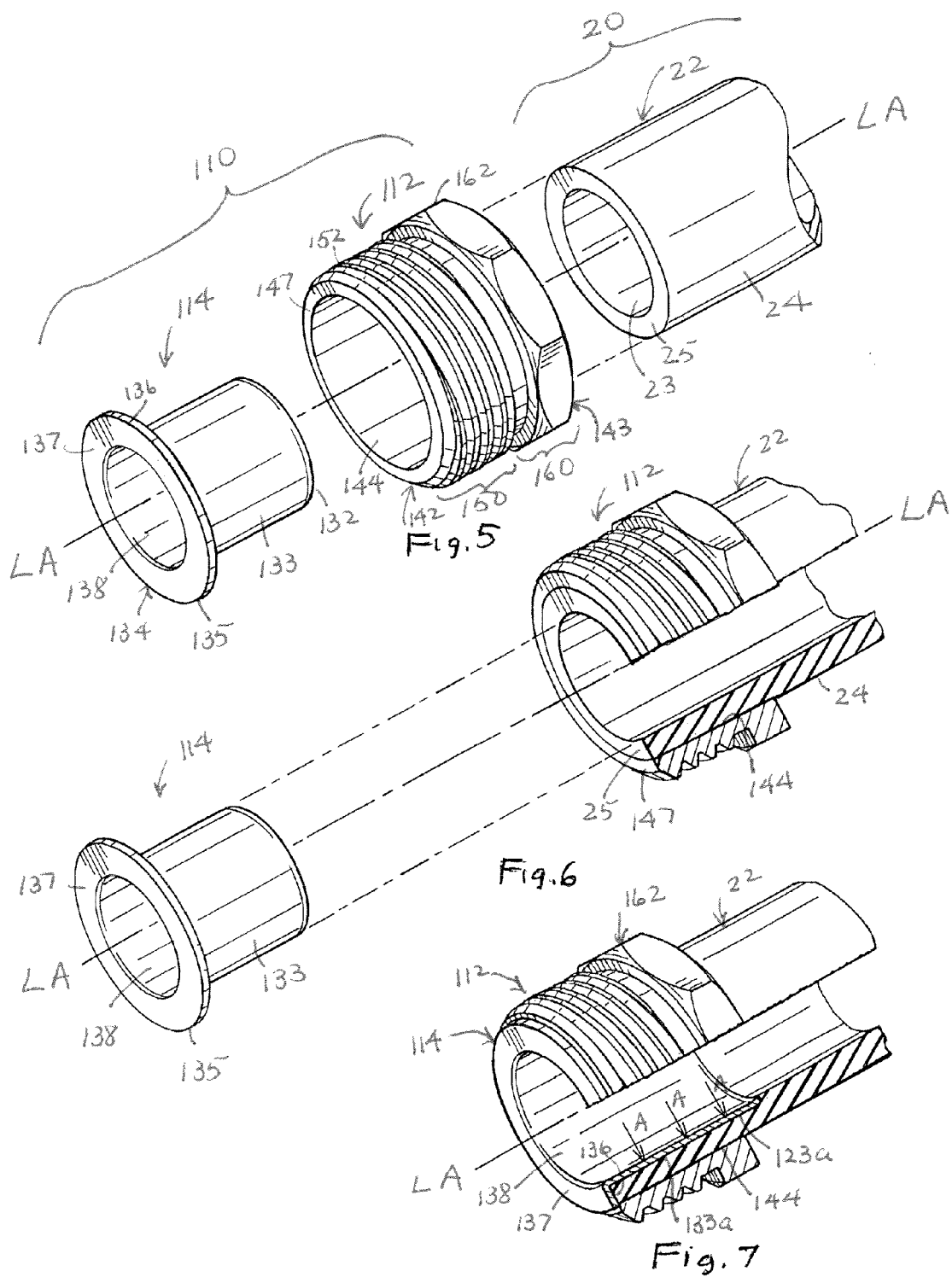

TWO PIECE MALE HOSE COUPLER AND METHOD FOR SECURING A GARDEN HOSE TO A COUPLER

FIELD OF THE INVENTION

The present invention relates to male hose connectors for garden hoses, and more particularly to a male coupler for attachment to a hose without a ferrule.

BACKGROUND OF THE INVENTION

Garden hoses are made of various rubber and plastic materials designed to provide a flexible, light-weight and resilient hose able to withstand the rigors of normal use. Hoses are provided with male and female end couplers by which the hoses are connected to one another, to faucets or spigots supplying liquid thereto, and to nozzles or sprinklers for dispensing the liquid.

Hose connectors that comprise machined metal components are of higher quality and crush proof character, as opposed to plastic or stamped metal components. However, machined metal components are generally more expensive to produce.

One common male hose coupler is a single piece made of brass or the like that includes at one end an internal threaded bore, and at the other end a cylindrical tail piece that is introduced into the hose end and permanently expanded outwardly to urge the hose into liquid tight engagement with a ferrule. The ferrule is another separate metal part placed over the outer end of the hose. The components in this type of assembly are relatively expensive, the manufacturing process includes multiple positioning and securing steps, and the resulting construction still has a potential leakage problem.

For example, when a coiled hose is pressurized to approximately 60 psi (standard commercial water pressure) and is pulled from one end the numerous loops of the coil formed over the length of the hose will often result in several kinks, with restricted flow of water. As the resulting water pressure in the hose escalates, water leakage may occur between the coupler and hose. In other instances, the hose or coupler may be deformed or crushed under a heavy load, such as when run over by an automobile tire. This may produce an immediate or subsequent water leakage between the hose and coupler.

While female hose couplers are generally made of machined metal parts, in many instances the male connectors are of lower quality stamped metal components which are not crush proof and are more prone to leakage. In some instances the male coupler is a combination of a threaded machined component and a stamped tail secured to the machined component by expanding or pressing the parts together, utilizing internal o-rings, by crimping or even by soldering. These additional steps and joints add to the cost of the manufacture and may also form a site of leakage.

Thus it would be desirable to provide a new construction for a male hose connector that provides secure engagement between the hose and coupler while being economical to manufacture and assemble.

SUMMARY OF THE INVENTION

In accordance with the invention, there is provided a two piece male hose coupler assembly that is relatively inexpensive to manufacture and assemble and that provides a secure connection against leakage. Compared to a typical ferrule/coupler design, the invention eliminates the ferrule and the sealing surface is effectively doubled. The result is a substantial increase in both pull strength (the amount of axially applied force required to separate the components) and a reduction in leakage.

The two piece assembly of the present invention includes a nut and an expandable tube. The nut has a first end portion with male threads on the exterior surface, and a second end portion having a gripping collar on the exterior surface. The nut has an open through bore defining an interior surface. An expandable tube is positionable within the bore of the nut, wherein the tube is expanded outwardly to pinch one end of a hose between an exterior surface of the tube and the bore of the nut so that the hose is sealed between the tube and the nut. Further, the tube has a radial flange at one end that seats against a radial mating surface at or adjacent the first end of the nut. The assembly thus provides a relatively leak proof connection including sealing surfaces between the mating radial flanges, and also along the mating longitudinal surfaces of the nut and hose extending along the longitudinal axis of the hose. In accordance with another embodiment of the invention, a method is provided for assembling the nut and tube at one end of the hose.

In accordance with one embodiment of the invention, an apparatus is provided comprising:

a male hose coupler assembly comprising a nut and an expandable tube aligned along a longitudinal axis of a hose for connection to one end of the hose, the nut having opposing first and second longitudinal end portions and a central longitudinal bore defining an interior surface, the first end portion having a male thread on a generally cylindrical exterior surface portion and the second end portion having a griping collar on an exterior surface portion;

the expandable tube being positionable within the bore of the nut, wherein the tube is expanded outwardly to pinch one end of the hose between an exterior surface of the tube and the bore of the nut so that the hose end is sealed between the tube and the nut; and wherein the tube has a radial flange at one end that seats against a radial mating surface in the bore of the nut located at or adjacent the first end of the nut.

In one embodiment, the interior surface of the nut has a plurality of protrusions to aid in sealing the hose between the tube and the nut.

In one embodiment, the nut is a machined metal part.

In one embodiment, the nut is an injection molded plastic part.

In one embodiment, the tube is a stamped metal part.

In one embodiment, the tube and nut are made of brass, aluminum or an alloy thereof.

In one embodiment, the nut is a machined metal part and the tube is a stamped metal part.

In one embodiment, the radial mating surface comprises a terminal radial end surface at the first end of the nut.

In one embodiment, the first end of the nut has an enlarged thickness radial flange forming a step within the bore, wherein the step forms the radial mating surface for engaging the radial flange of the tube.

In accordance with another embodiment of the invention, a method of attaching a male hose coupler assembly to a first end portion of a hose is provided, the first end portion of the hose having an exterior surface and an inner diameter surface, the coupler comprising a nut and an expandable tube, the tube having first and second ends with a radial flange at the first end, and the nut having an exterior surface, first and second ends, and an interior surface forming a through bore, the first end of the nut having male threads on the exterior surface and the second end of the nut having a griping collar on the exterior surface, the interior surface having a step defining a radial mating surface, the method comprising steps of:

inserting the second end of the tube into the first end portion of the hose such that the exterior surface of the tube is disposed adjacent the inner diameter surface of the hose portion and wherein the tube flange is positioned to abut the first end of the hose;

applying the nut over the assembled tube and hose portion such that the first end portion of the hose is positioned between the exterior surface of the tube and the interior surface of the nut and the tube flange engages the radial mating surface of the nut; and expanding the inner diameter of the tube to compress the hose portion between the tube and the nut.

In accordance with another embodiment of the invention, a method attaching a male hose coupler assembly to a first end portion of a hose is provided, the first end portion of the hose having an exterior surface and an inner diameter surface, the coupler comprising a nut and an expandable tube, the tube having first and second ends with a radial flange at the first end, and the nut having an exterior surface, first and second ends, and an interior surface forming a through bore, the first end of the nut having a male thread on the exterior surface and the second end of the nut having a griping collar on the exterior surface, the first end of the nut defining a radial mating surface, the method comprising steps of:

applying the second end of the nut over the first end portion of the hose such that the interior surface of the nut is disposed over an exterior surface of the first end portion of the hose;

inserting the tube into the assembled nut and hose portion such that the first end portion of the tube is positioned in the inner diameter hose surface and the first end portion of the hose is disposed between the exterior surface of the tube and the interior surface of the nut and the radial tube flange engages the radial mating surface of the nut; and expanding the inner diameter of the tube to compress the hose portion between the tube and the nut.

BRIEF DESCRIPTION OF THE DRAWINGS

FIG. 1 is an exploded perspective view of a nut, tube and one end of a hose according to a first embodiment of the invention, prior to assembly, with the nut, tube, and hose end aligned along a common longitudinal axis;

FIG. 2 is a perspective view of the components of FIG. 1, partially assembled, with the tube inserted into the inner diameter of the hose, prior to attaching the nut;

FIG. 3 is a perspective view of the components of FIG. 1, fully assembled, with the nut disposed over the assembled hose and tube, and with arrows showing a compressive force applied to pinch the end of the hose between the tube and nut;

FIG. 5 is an exploded perspective view similar to FIG. 1 but of a second embodiment of the invention, unassembled, wherein the nut is first slid over the hose, followed by insertion of the tube;

FIG. 6 is a perspective view of the components of FIG. 5, partially assembled, with the nut assembled over the hose;

FIG. 7 is a perspective view of the components of FIG. 5, fully assembled, with the tube now inserted into the assembled nut and hose, and with arrows showing the application of a compressive force to pinch the end of the hose between the tube and nut.

DETAILED DESCRIPTION OF THE INVENTION

Figure 4:
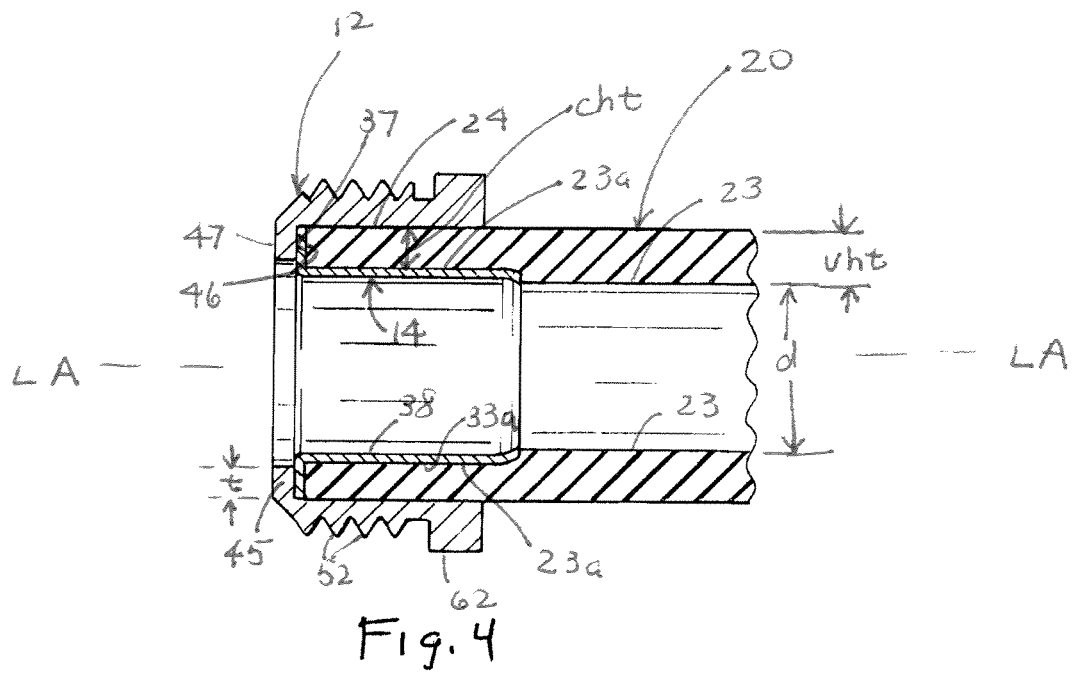
FIG. 4 is a cross sectional view of the assembly of FIG. 3.

Referring now to the drawings, FIGS. 1-4 illustrate a first embodiment of the invention. A male hose coupler assembly 10 is shown including a nut 12 and an expandable tube 14 that are both aligned along a longitudinal axis LA. The tube and nut are configured to be assembled over a similarly longitudinally aligned end portion 22 of a hose 20. End portion 22 comprises a tubular body defined by central axis LA and having an inner radial cylindrical surface 23 defining a bore of the hose, and an outer radial cylindrical surface 24 defining an outer surface of the hose. The terminal end 25 of the hose, a surface generally transverse to axis LA, is shown facing a first end 32 of the tube 14. The first end of the tube may be flat or rounded (to ease insertion into the hose end portion) but is generally of the same outer diameter as the major cylindrical portion 33 of the tube. The opposing second end 34 of the tube has a flange 35 projecting racially outwardly from the outer cylindrical surface 33 of the tube. The outer surface 33 of the unexpanded tube (shown if FIGS. 1-2) is of a similar diameter (e.g., an interference fit with a $\frac{1}{16}$ or $\frac{1}{32}$ inch clearance) as the inner diameter d of the bore 23 of the hose (see FIG. 4), so that the tube can be slid (press fit) into the hose bore and be held in position while being expanded radially outwardly (as shown by arrows A in FIG. 3) to a larger outer diameter 33a. During expansion of the tube (e.g., by a known crimping tool), the end portion 22 of the hose is compressed between the expanded tube outer surface 33a and the bore of the nut 12. In one embodiment, the hose end portion 22 is made of a resilient rubber or plastic material and is radially compressed to a reduced thickness (compressed hose thickness cht) in a range of from about 10-35% of the uncompressed hose thickness (uht) (see FIG. 4). The amount of compression depends on the hose material and the pull off strength required by the assembly. For example, a typical PVC hose may be compressed in the mid range (e.g., 20%) to provide an optimal seal without risk of breaking (over stretching) the metal tube. A rubber hose may provide a stronger push back force, and require a higher compression (e.g., 25%) to maximize the seal. Preferably, the materials, dimensions and configuration of the assembly are selected to maximize (under applicable use conditions) both the ability to hold a liquid tight seal (see e.g., ASTM, D3901-90, Standard Consumer Product Specification for Garden Hose, ¶6.5 and 7.4 (Hose Assembly Integrity against leakage)) and the pull strength (see e.g., ASTM D 3901-90, ¶ 6.7 and 7.8 Coupling Pull-Off).

FIG. 2 shows the tube 14 inserted into the hose end portion 22 (partial assembly), wherein a rear surface 36 of the tube flange engages the terminal end surface 25 of the hose. These two mating axial surfaces 36, 25 are both generally flat and transverse to LA, to assist in sealing the tube to the hose in the full assembly (see FIGS. 3-4). The expanded outer cylindrical surface 33a of the tube and the compressed inner diameter 23a of the hose end portion (after the tube wall is expanded) also comprise mating axial surfaces (extending along axis LA), providing further sealing engagement (see FIGS. 3-4). The bore 44 of the nut and the compressed outer diameter 24a of the hose end portion 22 (extending along LA) provide additional mating axial sealing surfaces, effectively doubling the overall sealing surface compared to a flange coupler. In this regard, a longer tube length will increase the axial seal length and thus enhance leak resistance and pull strength. Because the tube is subsumed within the nut, the overall coupler length is substantially reduced (compared to the typical flange coupler), while the seal length is doubled.

As shown in FIGS. 1-4, the nut 12 has first and second longitudinal ends 42, 43 respectively. The nut has a central bore defined by a radial inner surface 44 that is sized to be slidably engaged over the exterior surface 24 of the hose. Adjacent the first end of the nut there is a radially enlarged flange 45 that provides an end stop at its back surface 46, generally transverse to LA, for receiving in mating planar engagement the front face 37 of the tube flange, in the assembled state (see FIGS. 3-4). This engagement of radial surfaces 46, 37 also helps seal the nut and tube (coupler) assembly to the hose to prevent leakage between the coupler and hose. The radial thickness t of the flange 45 (see FIG. 4) may vary depending upon materials and the desired application and use conditions, including hose thickness and diameter.

The nut 12 includes first and second end portions 50, 60, respectively. The first end portion 50, adjacent the first end 42, includes a generally cylindrical exterior surface portion 51 with a projecting male thread 52. The male thread is configured to engage a female thread in a bore of a corresponding female coupler (not shown), e.g., for connecting the hose 20 to a spigot or to another hose or dispenser. The generally flat radial front face 47 of the nut flange, which forms the terminal end of the nut, is configured to engage with a mating flat radial surface in the bore of the corresponding female coupler, typically with a resilient member (e.g. rubber hose washer or o-ring) there between, to form a liquid tight seal.

At the opposing second end portion 60 of the nut 12, adjacent the second end 43, a collar is provided for griping (e.g., by hand or tool) the male coupler. The collar OD (outer diameter) may or may not extend radially beyond the thread OD. Often, as shown here, the collar 62 projecting radially outwardly and has a polygonal outermost peripheral surface 63 that can be engaged by a wrench or other tool to aid in gripping the coupler, e.g., when disconnecting or connecting the coupler to another coupler or spigot. Alternative designs also include enlarged diameter (compared to the OD of the threaded portion) ergonomic grips to eliminate the need for a tool when tightening this coupler to another coupler in liquid-tight engagement.

In the disclosed embodiment, the nut 12 is a cast or extruded metal part that has been machined (shaped) to form the various surface configurations (e.g., thread, nut flange and collar); this provides a greater crush resistance than a stamped part. In contrast, the flanged tube is an extruded and stamped metal part, which is less expensive to manufacture than a machined metal part (and provides a thinner wall to allow radial expansion of the major tube portion). In alternative embodiments, the metal may be brass, aluminum or other metal, or an alloy thereof. The nut and tube may be the same or different metal materials. The nut may be an injection molded plastic part (e.g., of ABS (acrylonitrile butadiene styrene), polyopropylene or other engineered plastic material for higher strength applications).

Figures 4A, 4B, 4C:
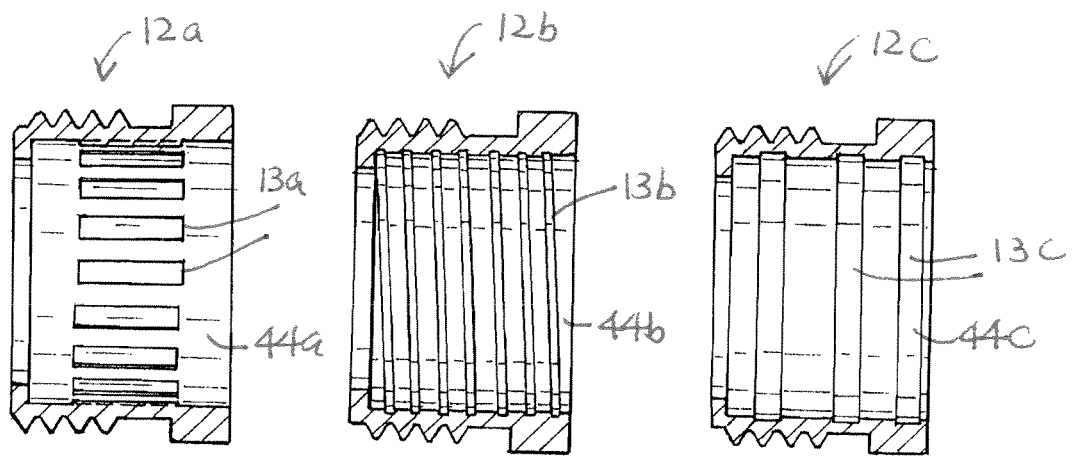
FIG. 4A is a cross sectional view of one embodiment of a nut having a broached or gear tooth pattern on its interior surface (bore) to aid in securing the nut to the hose.
FIG. 4B is a cross sectional view of another embodiment of the nut having an internal threaded form for securing the interior surface of the nut to the hose.
FIG. 4C is a cross sectional view of another embodiment of the nut having internal undercuts for attaching the nut to the hose.
Figure 8:
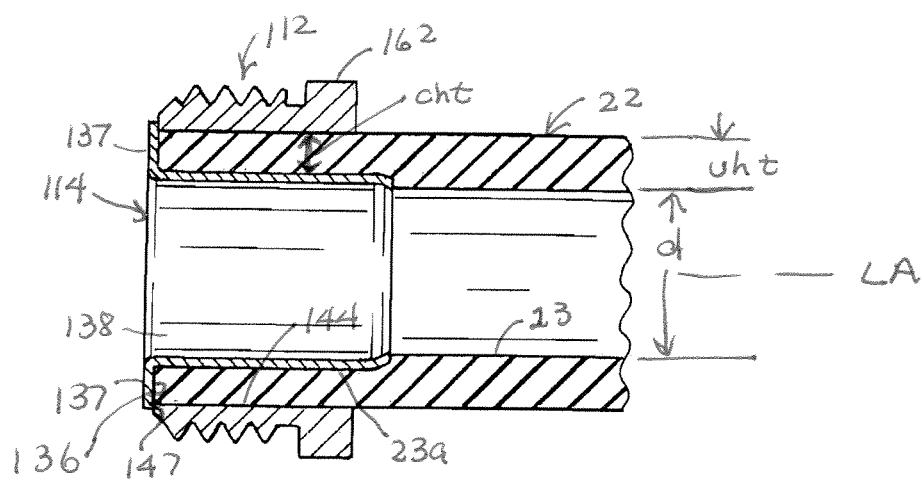
FIG. 8 is a cross sectional view of the assembled components of the second embodiment.

FIGS. 4A-4C illustrate three alternative interior surface configurations of the nut bore 44 to further aid in sealing the compressed hose end portion between the expanded tube and the nut bore. These are by way of example only, and other surface configurations will be apparent to the skilled person. FIG. 4A illustrates a plurality of circumferentially spaced apart linear grooves 13a, each aligned with LA, formed in the pattern of gear teeth (e.g., formed by cutting away or broaching the interior bore surface 44a); the resilient hose material will fully or partially fill these grooves 13a when the tube is expanded outwardly, and this further engagement via the filled grooves will increase the resistance to rotation (of the hose with respect to the coupler assembly) and increase the pull off strength of the hose and coupler assembly (e.g., when a user pulls on one end of the hose, exerting a force in direction LA). FIG. 4B illustrates an alternative design with an internal thread 13b cut into the bore 44b of the nut 12b. FIG. 4C illustrates yet another example with internal undercuts 13c formed in the bore 44c of the nut 12c at spaced apart locations along LA.

In accordance with a first method embodiment of the invention, the nut and tube is affixed to the end portion of the hose as illustrated in the steps shown in FIGS. 1-3. Accordingly, a method of attaching a male hose coupler assembly to a first end portion of a hose is provided, the first end portion of the hose having an exterior surface and an inner diameter surface, the coupler comprising a nut and an expandable tube, the tube having first and second ends with a radial flange at the first end, and the nut having an exterior surface, first and second ends, and an interior surface forming a through bore, the first end of the nut having male threads on the exterior surface and the second end of the nut having a griping collar on the exterior surface, the interior surface having a step defining a radial mating surface, the method comprising steps of:

inserting the second end of the tube into the first end portion of the hose such that the exterior surface of the tube is disposed adjacent the inner diameter surface of the hose portion and wherein the tube flange is positioned to abut the first end of the hose;

applying the nut over the assembled tube and hose portion such that the first end portion of the hose is positioned between the exterior surface of the tube and the interior surface of the nut and the tube flange engages the radial mating surface of the nut; and expanding the inner diameter of the tube to compress the hose portion between the tube and the nut.

FIGS. 5-8 are similar to FIGS. 1-4 but illustrate a second embodiment of the nut and tube assembly 110 and method of assembly. In this second embodiment, like components are similarly numbered but with a "100" series prefix. The tube 114 and nut 112 may be the same or similar to those shown in FIGS. 1-4, with the following differences: a) there is no radially enlarged flange on the first end 142 of the nut 112 and thus no step (stop) formed in the nut bore 144; and b) during assembly, the nut 112 is first slid over the hose end portion 22 (FIG. 6), and then the tube 114 is inserted into the nut bore 144 of the combined hose and nut assembly (FIG. 7). As a result, the flange 135 at the first end 134 of the tube now forms a front face of the assembly, with a rear surface 137 of tube flange in substantially planar engagement with the generally flat end surface 25 of the hose and preferably also with a radially aligned flat end surface 147 of the nut. This forms a liquid tight seal at the end of the assembly, in combination with the mating elongated surfaces 133a, 123a, and 144 of the expanded tube, compressed hose and bore of the nut.

In this second embodiment, a method of attaching a male hose coupler assembly to a first end portion of a hose is provided, the first end portion of the hose having an exterior surface and an inner diameter surface, the coupler comprising a nut and an expandable tube, the tube having first and second ends with a radial flange at the first end, and the nut having an exterior surface, first and second ends, and an interior surface forming a through bore, the first end of the nut having a male thread on the exterior surface and the second end of the nut having a griping collar on the exterior surface, the first end of the nut defining a radial mating surface, the method comprising steps of:

applying the second end of the nut over the first end portion of the hose such that the interior surface of the nut is disposed over an exterior surface of the first end portion of the hose;

inserting the tube into the assembled nut and hose portion such that the first end portion of the tube is positioned in the inner diameter hose surface and the first end portion of the hose is disposed between the exterior surface of the tube and the interior surface of the nut and the radial tube flange engages the radial mating surface of the nut; and expanding the inner diameter of the tube to compress the hose portion between the tube and the nut.

As used herein, a garden hose is meant to include any of various hoses that are of the size and type commonly used for watering plants, or for cleaning (e.g., houses, boats, animals and the like). The fluid conveyed by such a hose is normally water, but may comprise other fluids such as herbicides, insecticides, fertilizer or cleaning solutions. The hoses may vary in length, e.g., in a range of 10 feet (3 meters) to 300 feet (91 meters), with an inside diameter of from about 0.125 inch (0.3 cm) to about 2 inches (5 cm). Typically, a garden hose is provided in lengths of 25, 50 or 100 feet, with an inside diameter of ⅝ (0.625) inch or ¾ (0.75) inch.

These and other features of the present inventions will be apparent to the skilled person from the disclosed embodiments which are not meant to be limiting.

What is claimed is:

1. A method of attaching a male hose coupler assembly to a first end portion of a hose, the first end portion of the hose having an exterior surface and an inner diameter surface, the coupler comprising a nut and an expandable tube, the tube having first and second ends with a radial flange at the first end, and the nut having an exterior surface, first and second ends, and an interior surface forming a through bore, the first end of the nut having male threads on the exterior surface and the second end of the nut having a griping collar on the exterior surface, the interior surface having a step defining a radial mating surface, the method comprising steps of:

inserting the second end of the tube into the first end portion of the hose such that the exterior surface of the tube is disposed adjacent the inner diameter surface of the hose portion and wherein the tube flange is positioned to abut the first end of the hose;

applying the nut over the assembled tube and hose portion such that the first end portion of the hose is positioned between the exterior surface of the tube and the interior surface of the nut and the tube flange engages the radial mating surface of the nut; and expanding the inner diameter of the tube to compress the hose portion between the tube and the nut.

2. The method of claim 1 wherein expanding the inner diameter of the tube further comprises compressing the hose portion between the tube and a plurality of protrusions provided on the interior surface of the nut.

3. The method of claim 1 further comprising forming the nut as a machined metal part.

4. The method of claim 1 further comprising forming the nut as an injection molded plastic part.

5. The method of claim 1 further comprising forming the tube as a stamped metal part.

6. The method of claim 1 further comprising forming the tube and nut from brass, aluminum, or an alloy thereof.

7. The method of claim 1 wherein the tube flange engages the radial mating surface of the nut by engaging a terminal radial end surface at the first end of the nut.

8. The method of claim 1 wherein the tube flange engages the radial mating surface of the nut by engaging an enlarged thickness radial flange forming a step within the bore.

\* \* \* \* \*